July 26, 1949. F. J. WARCUP 2,477,222
BEER DISPENSER WITH COIL CLEANING MEANS
Filed Nov. 20, 1944 2 Sheets-Sheet 1

INVENTOR
Frederick J. Warcup
BY
Emery, Varney, Whittemore & Dix
ATTORNEYS

July 26, 1949.  F. J. WARCUP  2,477,222
BEER DISPENSER WITH COIL CLEANING MEANS
Filed Nov. 20, 1944  2 Sheets-Sheet 2
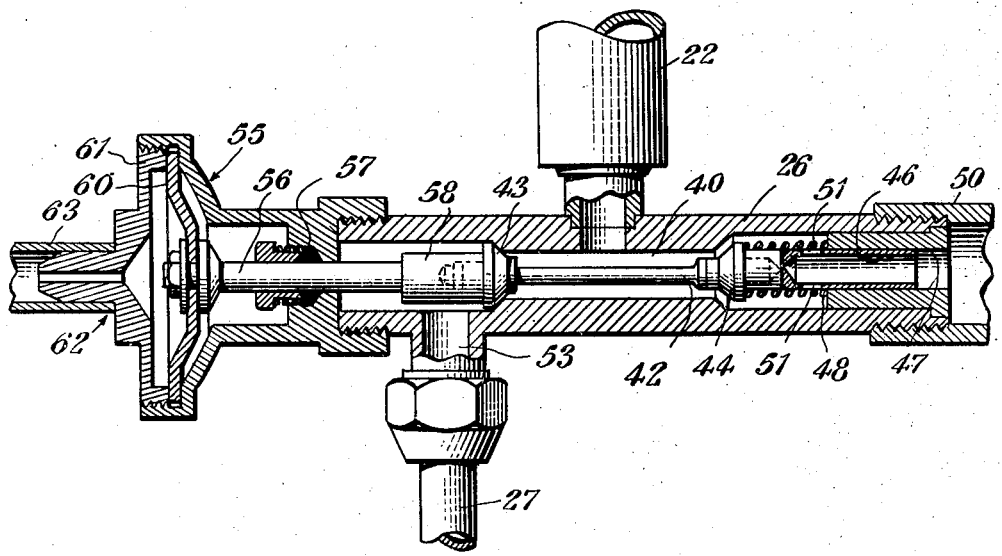
Fig. 2.
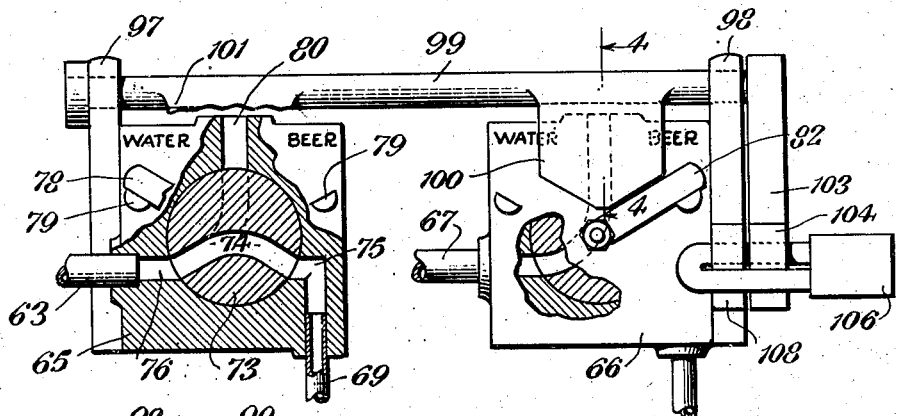
Fig. 3.
Fig. 4.
INVENTOR
Frederick J. Warcup
BY
Emery, Varney, Whittemore & Co.
ATTORNEYS Patented July 26, 1949

2,477,222

UNITED STATES PATENT OFFICE 2,477,222

BEER DISPENSER WITH COIL CLEANING MEANS

Frederick J. Warcup, Nyack, N. Y.

Application November 20, 1944, Serial No. 564,187

3 Claims. (Cl. 225—12)

This invention relates to beer distributing systems such as are used in taverns and saloons for conducting beer from kegs, in which the beer is delivered from the brewery, to taps located behind the bar. The length of piping between a keg and the tap includes a cooling coil through which the beer flows.

One object of the invention is to provide an improved beer distributing system in which water can be conveniently introduced into the beer lines and accurately controlled so as to avoid the loss of beer that results from having beer stand in the pipes, from draining of the lines for cleaning, and the loss that occurs when an empty keg is replaced with a full one.

Beer that stands for a long time in the cooling coil or other piping between the keg and tap undergoes a change that impairs the taste. The best taverns consider beer that has stood in the pipes overnight to be unfit for customers and each tap is permitted to run in the morning until fresh beer from the keg reaches the tap. The beer which runs out is ordinarily wasted, and in the usual distributing system amounts to about six glasses.

It is necessary to clean the beer lines from time to time by running clean solutions through them. The conventional practice is for a tavern to have this work done by someone who comes in at least once a week for the purpose. It is, of course, necessary to remove the beer that is in the lines before cleaning them, and this usually entails some loss of beer for the tavern every time the line cleaner comes.

It is another object of this invention to provide means by which tavern operators can clean their own lines without having to connect or disconnect any unions or fittings, and in the preferred embodiment of the invention the system is constructed so that the beer lines can be cleaned without even leaving the bar. The tavern operator can fill his beer lines with water preparatory to cleaning them and all of the usual loss of beer incident to cleaning lines is avoided.

Another important saving is effected by this invention when a keg becomes empty and it is necessary to tap a new keg. Whenever the contents of one keg become exhausted, the beer line fills with foam and the first beer from a new keg surges into the line and foams to such an extent that the first glasses drawn after a new keg has been tapped cannot be used because of excessivee foam. With this invention the line is filled with water before tapping a new keg and there is no surge of beer into the line.

One feature of the invention relates to valve means by which a beer line can be selectively connected with a beer keg or with a water-supply line so that by manipulating the valve water can be made to displace a column of beer above it in the piping, or beer from the keg can be made to displace water standing in the pipe. Other features relate to the control of the valve means from a remote location, preferably a location in the vicinity of the tap at which the beer line terminates, so that the bartender can control the expulsion of beer from the line by water in accordance with his anticipated demand when filling the line up with water before closing down at night. Another feature relates to a simple construction for locating the beer distributing system so that no beer can be drawn from the taps when the system is shut down for the night.

The preferred embodiment of the invention includes a servo-actuated valve that controls both the beer and water flow, and it is a feature of the invention that upon any failure in the operation of the valve control apparatus, the valve is shifted into position to connect the keg with the beer line just as it would be connected in a distributing system with which the invention is not employed.

Other objects, features and advantages of the invention will appear or be pointed out as the description proceeds.

In the drawings, forming a part hereof, in which like reference characters indicate corresponding parts in all the views, Figure 1 is a diagrammatical illustration of a beer distributing system embodying this invention, and Figure 2 is an enlarged sectional view through one of the valves shown in Figure 1.

Figure 3 is an enlarged detailed view, partly in section, showing the control apparatus of Figure 1.

Figure 4 is a sectional view on the line 4—4 of Figure 3.

Figure 1:
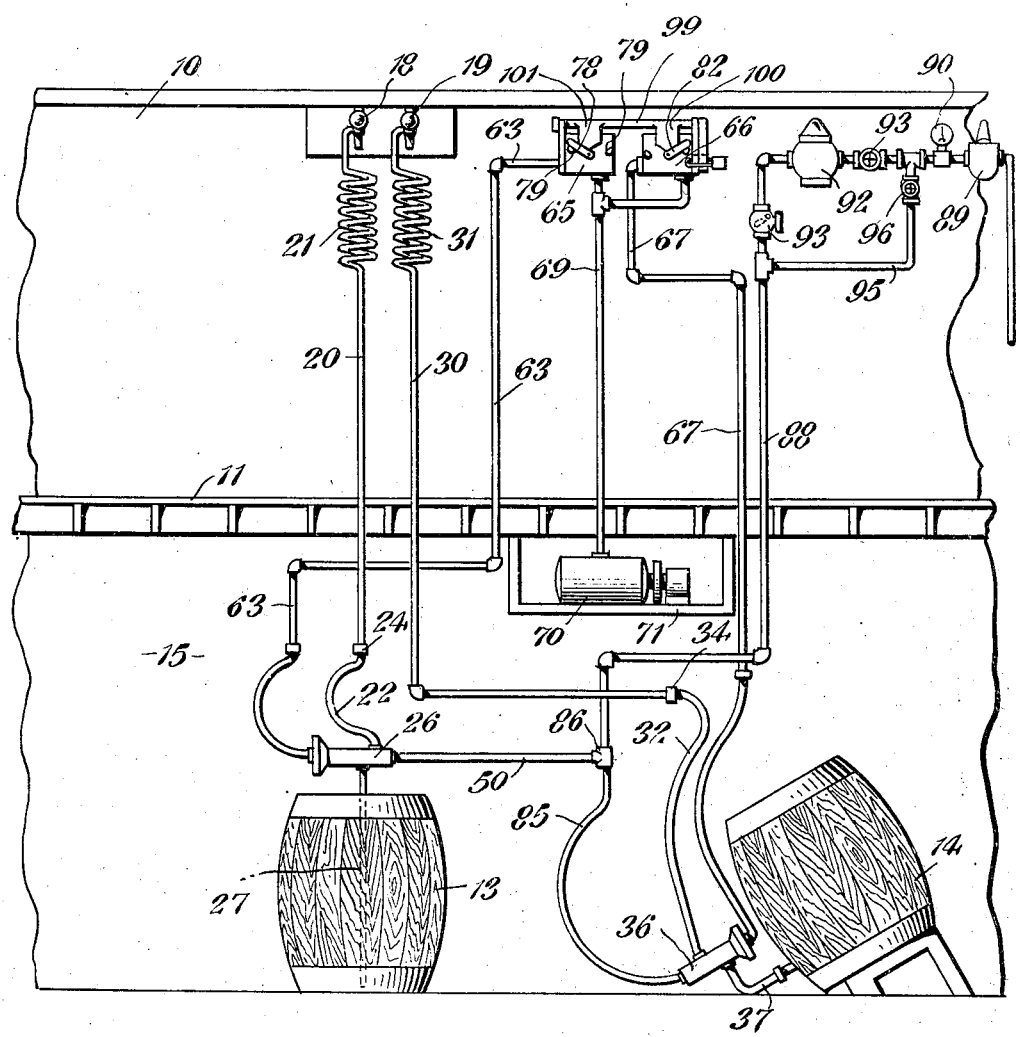

Figure 1 illustrates a tavern in which there is a bar 10 supported on a floor 11, and the taps of the bar are connected with kegs 13 and 14, located on the floor below the bar, usually in a basement 15.

A commercial bar is always equipped with a number of taps, and the drawing shows two taps 18 and 19 which are sufficient for purposes of illustration, but it will be understood that the invention can be applied to bars having any number of taps. The tap 18 is connected with the keg 13 by piping 20 that includes a cooling coil 21 and a flexible hose 22. The cooling coil is permanently associated with suitable refrigerating means, not illustrated, and the portion of the piping that extends down through the floor 11 is rigidly secured in position as far down as a fitting 24. The upper end of the flexible hose 22 is fastened to this fitting 24, and the lower end of the hose 22 is attached to a valve housing 26 at the upper end of a rod 27 that is used to tap the keg 13.

The tap 19 is connected with the keg 14 by piping 30 which includes a cooling coil 31, associated with refrigerating apparatus, and a flexible hose 32 connected at its upper end to a fitting 34 which is at the end of the rigid portion of the piping 30. A valve housing 36 is connected with the lower end of the hose 32 and this valve housing has a connector 37 that is used to tap the keg 14.

The rod 27 and connector 37 are illustrative of different types of devices used in taverns for tapping beer kegs and for connecting the kegs with the beer distributing lines of the bar.

The valve housing 26 is shown in section in Figure 2. Within this housing there is a conduit 40 with a port through which the hose 22 communicates with the conduit 40. At opposite ends of the conduit 40 there are valve seats. The housing 26 includes a valve comprising a stem 42 with valve elements 43 and 44 at its opposite ends. The valve element 43 cooperates with the seat at the left-hand end of the conduit 40, and the valve element 44 cooperates with the seat at the other end of the conduit 40. The stem 42 is of such length that one of the valve elements 43 or 44 must be in open position in order to permit the other valve element to move into contact with its seat.

The valve element 44 is connected with a sleeve 46 that slides in a bushing 47 which serves as a bearing for maintaining the valve element 44 with its axis coincident with the axis of the valve seat with which it cooperates. A spring 48 surrounds the sleeve 46 and is compressed between the valve element 44 and the end of the bushing 47 so as to urge the valve element 44 into a normally-closed position, and the valve element 43 into a normally-open position.

The right-hand end of the valve housing 26 is connected with a water-supply line 50 and there are openings 51 in the sleeve 46 for permitting water to flow from the sleeve into the space in the housing 26 around the sleeve.

The valve housing 26 has a branch 53 that connects it with the rod 27 and that opens into the valve housing just beyond the valve element 43. From this construction it will be evident that with the valve elements in the positions shown in Figure 2, water from the line 50 flows through the sleeve 46, openings 51, past the open valve element 44 and through the conduit 40 to the beer line. When the valve elements are in their normal positions, that is, the valve element 44 is in closed position, and valve element 43 open, beer from the keg flows through the rod 27, branch 53, past the open valve element 43 and through the conduit 42 to the beer line 22.

There is a servomotor 55 attached to the end of the valve housing 26. An operating stem 56 of the servomotor 55 extends through a stuffing box 57 in the end of the valve housing 26, and the end of the operating stem 56 is joined to a connecting piece 58 secured to the valve element 43. The bearing in the stuffing box 57 serves as a support for centering the valve element 43 with its axis coincident of the axis of the valve seat against which it closes.

The servomotor 55 includes a diaphragm 60 clamped in the housing of the motor by a clamping ring 61 that is an integral part of a fitting 62 by which the servomotor is connected with an air line 63. The diaphragm 60 is displaced toward the right in Figure 2 and the valve moved against the pressure of the spring 48, to shift the parts into the positions illustrated in Figure 2, whenever the compressed air is supplied to the servomotor. When air is exhausted from the air line 63, the spring 48 immediately restores the parts to their normal positions with the valve element 44 closed and the valve element 43 open. With this construction the beer keg is connected with the beer line, just as it would be as if this invention were not employed, in the event of a failure of the compressed air supply, or in the event of any damage to the servomotor 55, or to the control valves, which might make it impossible to operate the servomotor.

Compressed air is supplied to the servomotor 55 through the air line 63 from a control valve located on the bar within convenient reach of the attendant who draws beer from the taps 18 and 19 (Figure 1). A valve 65 on the bar 10 controls the supply air to the air line 63. Another valve 66, located in the same housing with the control valve 65, controls the supply of air to an air line 67 which leads to the servomotor of the distributing valve 36 for the beer line that supplies beer to the tap 19. Air flows to both of the control valves 65 and 66 through tubing 69 that leads to a compressed air tank 70. A motor-operated compressor 71 is shown connected with the compressed air tank 70.

The valves 65 and 66 are shown in detail in Figure 3. The valve 65 includes a valve element 73 in which there is a passage 74 for connecting an air inlet port 75 with an outlet port 76. The air inlet port connects with the tubing 69 that leads to the compressed air tank, and the air outlet port 76 is connected with the air line 63 that supplies air to the servomotor of the distributing valve. The valve element 73 is rotated by a handle 78. Abutments 79 on the front of the housing of the valve 65 limit the movement of the handle 76 to an angle of 120 degrees.

The handle 78 is against the left-hand abutment 79 when the valve element 73 is in the position shown in Figure 3. Movement of the handle 78 to the right-hand abutment shifts the passage 74 into the dotted line position shown in Figure 3, and in such position the passage 74 connects the port 76 with an exhaust port 80 which opens into the atmosphere. With the handle 78 against the left-hand abutment 79 the servomotor is actuated and the distributing valve shifted into position to supply water to the beer line. This fact is indicated by the legend "water" on the front of the valve housing. There is a legend "beer" above the position that the handle 78 occupies when shifted against the right-hand abutment 79 since the valve element 76 permits compressed air to exhaust from the air line 63 when the handle 78 is against the right-hand abutment 79. The construction of the valve 66 is similar to that of the valve 65, and the valve 66 is operated by a handle 82 which is similar to the handle 78.

Referring again to Figure 1 the water-supply line 50 leading to the distributing valve 26, and a corresponding water-supply line 85 leading to the distributing valve 36, are connected to a common fitting 86. This fitting 86 is supplied with water from piping 88 which leads to the city water supply connection or other source from which the tavern receives its water. Figure 1 shows a conventional reducing valve 89 and pressure gage 90 on the water-supply line 88.

A chemical tank 92 is connected in the water-supply line 88 with valves 93 both ahead of and behind the tank 92. There is a by-pass 95 around the chemical tank 92. A valve 96 in the by-pass 95 is used to close the by-pass when it is desired to have water flow through the chemical tank 92. In the ordinary operation of the invention, the valves 93 are closed and the valve 96 is open so that water flowing through the water line 88 does not pass through the chemical tank 92. When the beer lines are to be chemically cleaned, the valves 93 are opened, and the by-pass 95 is shut off by closing the valve 96, so that all water flowing to the beer distributing system passes through the chemical tank 92.

The tank 92 is preferably located behind the bar and at a convenient location so that the bartender can operate the valves 93 and 96, and put new cleaning material in the tank 92 when necessary, without having to leave the bar. The tank 92 has a removable cover and can be filled with any conventional cleaning material such as sodium chloride and tri-sodium phosphate.

The control valves 65 and 66 are equipped with interferences for preventing operation of handles 78 and 82 by unauthorized persons. This construction is best shown in Figure 3. On the sides of the valves 65 and 66 there are supports 97 and 98 that extend above the upper ends of the valve housings and provide bearings for a shaft 99. An interference comprising a tab 100 extends forward and downward from the shaft 99 into position to block movement of the handle 82. The tab 100 is shaped so that it blocks movement of the handle 82 equally well regardless of whether the handle is in the "water" or "beer" position. There is a similar interference tab 101 that extends down in front of the valve 65 for preventing movement of the handle 78. This tab 101 is broken off in Figure 3 to expose underlying structure.

At the right-hand end of the shaft 99 there is a crank 103 with a lug 104 at its lower end. There is an opening through the lug 104 for receiving a padlock 106.

When the interference tab 100 is in the position illustrated in Figures 3 and 4, the crank 103 extends downwardly and the opening for receiving the padlock registers with a similar opening in a lug 108 on the valve 66 so that the padlock 106 can be passed through both of these registering openings and locked to prevent movement of the crank 103. Both of the valve handles 78 and 82 are thereby locked in whatever position they occupy when the shaft 99 is turned to bring the interference tabs 100 and 101 into their lowered positions. When the valves 65 and 66 are unlocked, the shaft 99 is turned to move the interference tabs into the dotted line position shown in Figure 4.

The operation of the invention is as follows:

When the beer distributing system is in operation, and a keg becomes empty, for example the keg 13, the bartender operates the valve 65 by shifting the handle to the "water" position. This operation of the valve 65 supplies compressed air to the servomotor which operates the distributing valve 26 and causes the distributing valve to shift into position in which it shuts off the beer line 27 from the keg 13 and establishes communication between the beer line 22 and the water-supply line 50. The bartender opens the tap 18 and leaves it open until water from the water-supply line 50 has filled the beer line 20, that is, until water flows from the tap 18. The tap is then closed.

The rod 27 is then removed from the keg 13, and a full keg is tapped by inserting the rod 27 in the usual manner. The valve 65 is then shifted to the "beer" position so that the distributing valve 26 will return to its normal position in which the beer line 22 is in communication with the new keg 13 and shut off from the water supply-line 50. The bartender again opens the tap 18 and permits the beer from the full keg to force the water in the beer line 20 out of the tap 18. As soon as beer begins to flow from the tap, the tap is closed and the system is ready for drawing beer from the new keg without any waste.

In addition to preventing the beer line from becoming filled with foam and preventing beer from the new keg from surging into the line and becoming agitated so that the first beer drawn from the line is not suitable for sale, this invention has the advantage of washing out the beer lines every time a new keg is connected.

After the busiest portion of the day, a tavern keeper shuts down some of the taps. With this invention the distributing valve 26 is operated to connect the water supply line 50 or 85 with the beer line before the tap is shut down. The tap is used to draw beer as needed until all of the beer in the line has been displaced by water. As soon as water begins to flow from the tap, that tap is closed and not used again until the next morning.

When closing down the last beer line at night, the bartender operates the control valve 65 or 66 which controls the introduction of water into the last beer line, as soon as it appears that not more than about six more glasses of beer are likely to be sold. With most beer distributing systems there are about six glasses in the beer line above the point where this invention introduces water into the beer line.

If it happens that the last line becomes filled with water, and there is another order for beer, it is not necessary for the bartender to fill the beer line completely in order to draw one more glass. He can operate the control valve to connect the beer line with the keg and then open the tap while one glass of water flows from the tap. During this time an amount of beer equivalent to one glass will flow into the lower end of the beer line. The control valve is again operated to shut off the communication between the beer line and the keg and to establish communication with the water line. The tap is again opened and allowed to flow until all of the water above the beer has been displaced from the line. The beer then flows from the tap and as soon as the one glass of beer has been filled, the beer line is again completely full of water. This method of operating the invention is made possible because of the fact that the beer and the water under pressure in tubing of moderate diameter do not mix.

In the morning the control valve 65 or 66 is operated to connect one of the kegs with its associated beer line, and the tap at the end of the beer line is opened and allowed to flow until all of the water in the line has been displaced by beer from the keg. The first beer that flows from the tap, therefore, is beer that has remained over night in the keg, rather than in the beer line.

When a beer line is to be cleaned, the distributing valve is operated ahead of time so that the beer remaining in the line can be sold, and after the line is full of water the various valves of the system are operated so that water from the reducing valve 89 flows through the chemical tank 92, water line 88, and from the fitting 86 to the particular beer line that is to be cleaned, the tap of that beer line being left open while the cleaning solution flows through the line. It will be evident from the piping layout of Figure 1 that one beer line can be cleaned while the other is being used for the distribution of beer.

While the fluid lines shown in Figure 1 are described as "piping," this term is used in a broad sense to designate pipes or tubing and in actual practice tubing is generally used. The control valves 65 and 66 with the servomotors to which they supply compressed air are merely representative of remote control means by which an attendant at the bar can shift the positions of the distributing valves 26 and 36 and hold these distributing valves in position to connect the beer line with either the keg or water-supply line. Various other motion or power-transmitting connections can be used, such as electric circuits, liquid columns, or mechanical connections like Bowden wire controls.

The preferred embodiment of this invention has been illustrated and described but changes and modifications can be made and some features can be used without others without departing from the invention as defined in the claims.

I claim as my invention:

1. A beer-distributing system including a beer line for supplying a tap, separate conduits for connecting the beer line with a keg and with a water main, a first valve chamber between the beer line and the conduit that connects with the keg, a valve seat in said first valve chamber, a valve element on the side of the seat toward the conduit end of said first valve chamber and in position to close against the seat in the direction in which beer flows through the chamber from the conduit toward the beer line, a second valve chamber between the beer line and the conduit that connects with the water main, a valve seat in said second valve chamber, a valve element on the side of the seat toward the conduit end of said second valve chamber and in position to close against the seat in the direction in which liquid flows through the second chamber from the conduit toward the beer line, and means for operating the valve elements to open them against the pressure in the respective valve housings to connect the beer line selectively with either the keg or water main, said means including structure operatively connecting the valve elements together for operation as a unit.

2. A beer-distributing system having a beer line that supplies a tap, separate conduits for connecting the beer line with a keg and with a water-supply line, a valve housing having a passage therein with an outlet communicating with the beer line, a valve chamber at one end of the passage with an inlet for communication with the conduit from the keg, another valve chamber at the other end of the passage with an inlet for communication with the conduit from the water-supply line, a valve seat at each end of the passage and located in the respective valve chambers, said valve seats being in substantial alignment with one another and facing in opposite directions away from one another, a valve element in each of the valve chambers in position to close against said seats in the direction of liquid flow toward the beer line, a common valve stem extending through the passage to which both of the valve elements are connected, said stem being of such length that it holds one valve element open when the other is closed, and means for operating the valve elements in both directions against the pressures of the liquids in the respective valve chambers.

3. A beer-distributing system including a beer line for supplying a tap, separate conduits for connecting the beer line with a keg and with a water main, a first valve chamber having an inlet connected with the conduit to the keg and an outlet communicating with the beer line, a second valve chamber having an inlet connected with the water conduit and an outlet connected with the beer line, a valve seat in each of the valve chambers, a valve element in each of the valve chambers on the upstream side of the valve seat, a connection between the valve elements for operating them in unison, operating means for the valve elements including spring means biasing the valve elements toward a position to shut off the water supply and maintain the beer line in communication with the beer keg, and a servomotor in position to move the valve elements against the spring means to shut off the beer supply and open the valve element that controls the supply of water, remote control means for the servomotor, a chemical tank connected with the water supply line, a bypass around the chemical tank and valve means for causing water to flow selectively through the chemical tank for supplying a column of chemical cleaning solution to the water supply line and under the other liquid in the beer line, or through a bypass to supply a column of water under the other liquid in the beer line.

FREDERICK J. WARCUP.

REFERENCES CITED

The following references are of record in the file of this patent:

UNITED STATES PATENTS

| Number | Name | Date |
| --- | --- | --- |
| 877,043 | Bowers | Jan. 21, 1908 |
| 1,480,126 | Sullivan | Jan. 8, 1924 |
| 1,588,890 | Horvath | June 15, 1926 |
| 1,860,288 | Hyndman | May 24, 1932 |
| 2,066,397 | Fogarty | Jan. 5, 1937 |
| 2,109,896 | Anderson | Mar. 1, 1938 |
| 2,158,381 | Raymond | May 15, 1939 |
| 2,189,448 | McCrory | Feb. 6, 1940 |